United States Patent
Tran et al.

(10) Patent No.: US 10,430,472 B2
(45) Date of Patent: Oct. 1, 2019

(54) APPARATUS AND METHOD FOR COLLECTING RESPONSES TO A PLURALITY OF PARALLEL LOOKUP QUERIES FROM A FLOW OF PACKETS AT A NETWORK SWITCH

(71) Applicant: Cavium, LLC, Santa Clara, CA (US)

(72) Inventors: Anh Tran, Santa Clara, CA (US); Mohan Balan, Santa Clara, CA (US)

(73) Assignee: Cavium, LLC, Santa Clara, CA (US)

( * ) Notice: Subject to any disclaimer, the term of this patent is extended or adjusted under 35 U.S.C. 154(b) by 790 days.

(21) Appl. No.: 14/632,709

(22) Filed: Feb. 26, 2015

(65) Prior Publication Data

US 2016/0253417 A1    Sep. 1, 2016

(51) Int. Cl.
*G06F 16/951* (2019.01)
*H04L 29/06* (2006.01)
*G06F 16/2453* (2019.01)
*H04L 12/741* (2013.01)

(52) U.S. Cl.
CPC ...... *G06F 16/951* (2019.01); *G06F 16/24532* (2019.01); *H04L 45/745* (2013.01); *H04L 69/22* (2013.01)

(58) Field of Classification Search
CPC . H04L 45/745; H04L 69/22; G06F 17/30902; G06F 17/30864; G06F 17/30442; G06F 17/30445; G06F 16/24532
USPC ........ 709/223, 224, 227, 236; 707/737, 741, 707/706, 713
See application file for complete search history.

(56) References Cited

U.S. PATENT DOCUMENTS

| | | | |
|---|---|---|---|
| 6,606,613 B1 * | 8/2003 | Altschuler | G06Q 10/10 706/21 |
| 8,553,686 B2 | 10/2013 | Smith | |
| 2005/0251575 A1 * | 11/2005 | Bayardo | G06F 17/30929 709/227 |
| 2012/0271813 A1 * | 10/2012 | Shen | G06F 17/30864 707/711 |
| 2014/0068176 A1 * | 3/2014 | Baryudin | G11C 15/00 711/108 |
| 2014/0149391 A1 * | 5/2014 | Walter | H04W 52/027 707/722 |

(Continued)

FOREIGN PATENT DOCUMENTS

EP    2407900 A1 *  1/2012 ....... G06F 17/30663

*Primary Examiner* — Robert W Beausoliel, Jr.
*Assistant Examiner* — Pedro J Santos

(57) ABSTRACT

A network lookup engine in a network switch is configured to generate multiple lookup queries for each incoming packet in parallel to a remote search engine. The number and type of the lookup queries depend on the protocols supported by the network switch. The responses from the search engine arriving at the lookup engine are not in the same order as the order of the packets. The network lookup engine is configured to collect the responses for the parallel lookup queries in two modes: 1) in-order mode in which the first packet having its lookup queries sent to the search engine has its responses collected first regardless of the order of the responses received from the search engine; 2) out-of-order mode in which the first packet having complete responses to its lookup queries from the search engine has its responses collected first regardless of the order of incoming packets.

31 Claims, 11 Drawing Sheets

(56) References Cited

U.S. PATENT DOCUMENTS

| | | | |
|---|---|---|---|
| 2014/0156636 A1* | 6/2014 | Bellamkonda | G06F 17/30489 707/718 |
| 2014/0281138 A1* | 9/2014 | Karamcheti | G06F 12/0246 711/103 |
| 2014/0281402 A1* | 9/2014 | Comparan | G06F 9/30189 712/214 |
| 2015/0199404 A1* | 7/2015 | Elias | G06F 17/30451 707/718 |
| 2016/0026718 A1* | 1/2016 | Hopkins | G06F 17/30867 707/715 |
| 2016/0191384 A1* | 6/2016 | Shelar | H04L 45/742 370/392 |

* cited by examiner

APPARATUS AND METHOD FOR COLLECTING RESPONSES TO A PLURALITY OF PARALLEL LOOKUP QUERIES FROM A FLOW OF PACKETS AT A NETWORK SWITCH

TECHNICAL FIELD

The present invention relates to lookup engine architectures for generating parallel network lookup requests per packet and collecting the lookup responses for these requests. More specifically, the invention relates to reconfigurable network lookup engines in a network switch, which generate parallel network lookup queries per packet and collect out-of-order responses for these queries. The invention also relates to the ability to configure the engine to collect the lookup responses in an in-order mode or in an out-of-order mode.

BACKGROUND

A data packet traveling on communication networks carries in itself a network protocol stack comprising multiple protocol layers along with the packet data. The protocol layers help the network switches to classify and route the packet properly and efficiently from its sending device to its receiving device.

Traditionally, each network switch parses an incoming data packet to understand its packed protocol stack, then analyzes and processes each protocol layer in the packet serially. As transistor size has been scaled following the Moore's law, the underlining hardware in the network switches has become increasingly fast. As a result, the network switches are desired to be able to analyze multiple protocol layers of each packet in parallel in order to boost the network performance.

The network switches nowadays can check multiple fields in a packet in parallel for packet classification by checking several fields in the packet to see whether they match with some predefined values. Based on the matching results, the packet is classified to a specific flow for further processing. Furthermore, a network switch can also scan multiple fields in the packet simultaneously for efficient handling of quality of service and security for the packet.

In addition, the network switches can perform multiple lookups in parallel on different protocol layers of the packet in order to make a quick and proper routing decision. For a non-limiting example, a network switch can perform MPLS and bridge lookups on layer 2 and IP lookups on layer 3 simultaneously. In some cases, the network switch applies a prioritized decision policy to deal with the lookup results corresponding to these lookup queries so that the packet is forwarded to a correct output port. As networks are moving towards software-defined architectures with more new network protocols expected to be added to the networks, the network switches are desired to do more lookup operations in parallel per packet.

For performing multiple parallel lookups, a network lookup engine in the network switch needs to build multiple lookup keys for each packet and sends these lookup keys on parallel lookup queries to a remote/centralized search engine. For each received lookup key, the search engine will then search in its database for a lookup data and sends this lookup data on a lookup response back to the lookup engine sometime later.

A network switch normally includes several network lookup engines for different packet processing purposes but has only one (or a few) centralized search engine, which is shared by all these network lookup engines, because the search engine is very expensive in term of silicon area. The search engine can receive multiple lookup queries from these network lookup engines at the same time. As a result, lookup responses from the search engine arriving at each of the network lookup engines may not be in the same order as the packets in the flow processed by that network lookup engine. In addition, the parallel lookup queries of the same packet may be for different protocol layers, which require different searching latency. As a result, the parallel lookup queries may get the responses from the search engine at different times. The network lookup engine must guarantee correctly collection of these out-of-order responses for the lookup queries of the packets it is processing.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures in which like reference characters refer to the same parts throughout the different views. It is noted that, in accordance with the standard practice in the industry, various features are not drawn to scale and emphasis instead being placed upon illustrating embodiments of the present invention. In fact, the dimensions of the various features may be arbitrarily increased or reduced for clarity of discussion. The scope of the present patent application is not limited to the disclosed embodiments, but also encompasses combinations of the disclosed embodiments, as well as modifications to the disclosed embodiments.

DETAILED DESCRIPTION

Figure 1:
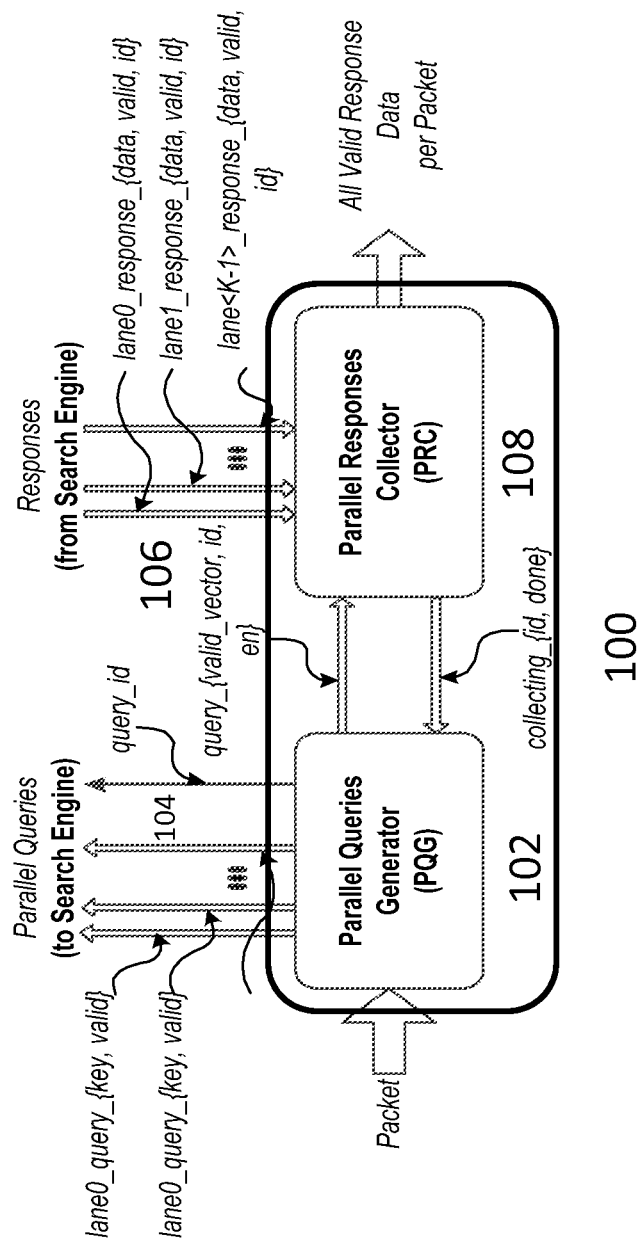
FIG. 1 is an example of a block diagram showing overall I/O interfaces of a network lookup engine in a network processing element/switch according to an embodiment of the present invention.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed, which contemplates system and method to collect responses to a plurality of parallel lookup requests/queries for each of a flow of incoming data packets with out-of-order responses collection support via a network lookup engine within a network switch. Under the proposed approach, the network lookup engine is configured to generate and transmit the plurality of lookup requests in parallel per data packet to a remote search engine on a plurality of query lanes and to collect the responses to the plurality of parallel lookup queries from the search engine on a plurality of response lanes, respectively. Since the responses from the search engine may arrive at the network lookup engine out-of-order compared to the order of the data packets received at the network switch, the proposed network lookup engine provides two reconfigurable modes for collecting the lookup responses from the search engine: 1) in-order mode in which the first of the incoming packets having its lookup queries transmitted to the search engine has its responses collected first regardless of the order of the responses received from the search engine; 2) out-of-order mode in which the first packet having complete responses received from the search engine has its responses collected first regardless of the order of incoming packets sending the lookup queries.

By providing support for out-of-order responses collection, the proposed approach enables correct collection of the lookup responses to the parallel lookup queries for each packet in the flow of packets processed by the network lookup engine irrespective of the order of the incoming packets and/or the lookup responses received from the search engine. Under the approach, a packet may collect its lookup responses as soon as those responses are available and a packet sending its lookup queries late could collect its lookup responses first if all of its responses are available. In this way, the overall network latency is improved as the packets are processed out-of-order without head-of-line blocking problem.

In addition, the proposed approach enables users to control whether the responses collection operates in the in-order mode or in the out-of-order mode. The in-order mode is especially useful while the users debug and test the network system. The out-of-order mode is desired in the real operating time when the users want the network to run as fast as possible. Here, the proposed approach supports any number and any types of the lookup queries generated in parallel by the network lookup engine in (which depend on the protocols supported by the network switch).

As referred to hereinafter, an engine includes a computing unit with software instructions that are stored in a storage unit of the computing unit for practicing one or more processes. When the software instructions are executed, at least a subset of the software instructions is loaded into memory/reconfigurable registers by the computing unit; the computing unit becomes a special purpose for practicing the processes. The processes may also be at least partially embodied in the computing unit into which computer program code is loaded and/or executed, such that, the computing unit becomes a special purpose computing unit for practicing the processes.

FIG. 1 is an example of a block diagram showing the overall input and output interfaces of the network lookup engine 100 in a network processing element/switch according to an embodiment of the present invention. Although the diagrams depict components as functionally separate, such depiction is merely for illustrative purposes. It will be apparent that the components portrayed in this figure can be arbitrarily combined or divided into separate software, firmware and/or hardware components.

In the example of FIG. 1, the network lookup engine 100 is configured to receive a plurality of input data packets and generate a plurality of (e.g. up to K) lookup queries for each of the packets in parallel on K query lanes/channels 104 to a remote search engine (not shown) via a parallel queries generator (PQG) 102 discussed in details below. The search engine, which is not a part of the present invention, is a remote engine which receives the lookup queries from one or more of the network lookup engines 100 and returns sometime later a lookup response (lookup result) for each of the lookup queries received.

Since the network lookup engine 100 is configured to process a flow of consecutive incoming packets, a unique query_id is associated to each of the parallel lookup queries of each packet to distinguish the lookup queries among different packets. All lookup queries of a packet should have the same query_id, while queries of different packets should have different query_id. As shown in FIG. 1, each of the lookup queries includes a pair of query_key and query_valid per packet on each of the query lanes 104, wherein the query_key is a lookup key used by the search engine for searching in its database of a matched lookup result data, and the query_valid signal indicates whether the query key sent on that query lane 104 is valid. If the query key is not valid, the search engine will ignore the lookup query.

For each lookup query having a valid query_key and sent over a query lane 104, the search engine will return sometime later a lookup response to the lookup query containing response_data on a corresponding response lane/channel 106. The search engine also returns on each response lane 106 a response_id along with the lookup response_data, wherein the response_id is equal to the query_id the search engine received from the corresponding query lane 104. The network lookup engine 100 can then identify which lookup query the arriving lookup response returned by the search engine based on the response_id. Here, the network lookup engine 100 only considers the response_data arrived on a response lane 106 if the associated response_valid signal is asserted. The search engine only returns a valid response_data on a response lane 106 if it receives a valid query_key from the corresponding query lane 104.

In some embodiments, more than one network lookup engines 100 can be served by a remote search engine at the same time, wherein each network lookup engine 100 can send multiple lookup queries in parallel to the search engine. In addition, the query type on each query lane 104 of the same packet may be different depending on the network protocols supported by the network lookup engines 100. Consequently, the searching time for those lookup queries may vary and may be different among all lookup queries from the same packet, and are different for lookup queries from different packets even on the same query lane 104 at the same network lookup engine 100. As a result, a packet having lookup queries are sent first may receive its responses after other packets having lookup queries are sent later. Even the parallel queries from the same packet may receive their responses from the search engine at different time. This complex situation is referred to as the "out-of-order lookup responses."

Although the responses from the parallel queries of the same packet may be out-of-order, they share the same response_id, which is equal to the query_id of that packet. Therefore, the network lookup engines 100 may properly collect all responses for a query packet by picking up all responses having their associated response_id being matched with the same query_id of the lookup queries of the packet. For lookup responses which are not collected yet, the network lookup engines 100 is configured to buffer (store) them upon their arrival at the network lookup engines 100 so that they are able to be collected at a later time.

In some embodiments, as shown in the example of FIG. 1, the network lookup engine 100 may include two main components: 1) a Parallel Queries Generator (PQG) 102, which is configured to generate a plurality of (up to K) lookup queries in parallel per packet and transmit these lookup queries to the search engine on a plurality of (K) query lanes 104; 2) a Parallel Responses Collector (PRC) 108, which is configured to store and collect the out-of-order lookup responses arrived/received from the search engine on a plurality of (K) response lanes 106 for the lookup queries previously sent by the PQG 102.

In some embodiments, the PQG 102 is also configured to provide the query_id of a packet and a query_valid_vector to the PRC 108 while generating the parallel lookup queries for the packet to the search engine. Here, the query_valid_vector is a multi(K)-bit vector indicating which lanes of the K query lanes 104 containing valid query keys for that packet. Based on this information, the PRC 108 is enabled to identify which response_id and which lanes of the K response lanes 106 it would wait for collecting the lookup responses for that packet.

After completing the collection of all valid responses for a queried packet, the PRC 108 is configured to return to the PQG 102 a collecting_id along with a collecting_done signal, wherein the collecting_done signal informs the PQG 102 that the PRC 108 has just done the response collection for a queried packet. Here, the collecting_id is equal to the query_id of the queried packet (which is also the response_id of the corresponding responses) so that the PQG 108 can recycle this query_id for the next incoming packet. By recycling query_ids, the network lookup engine 100 saves the hardware cost and make its design feasible.

Figure 2:
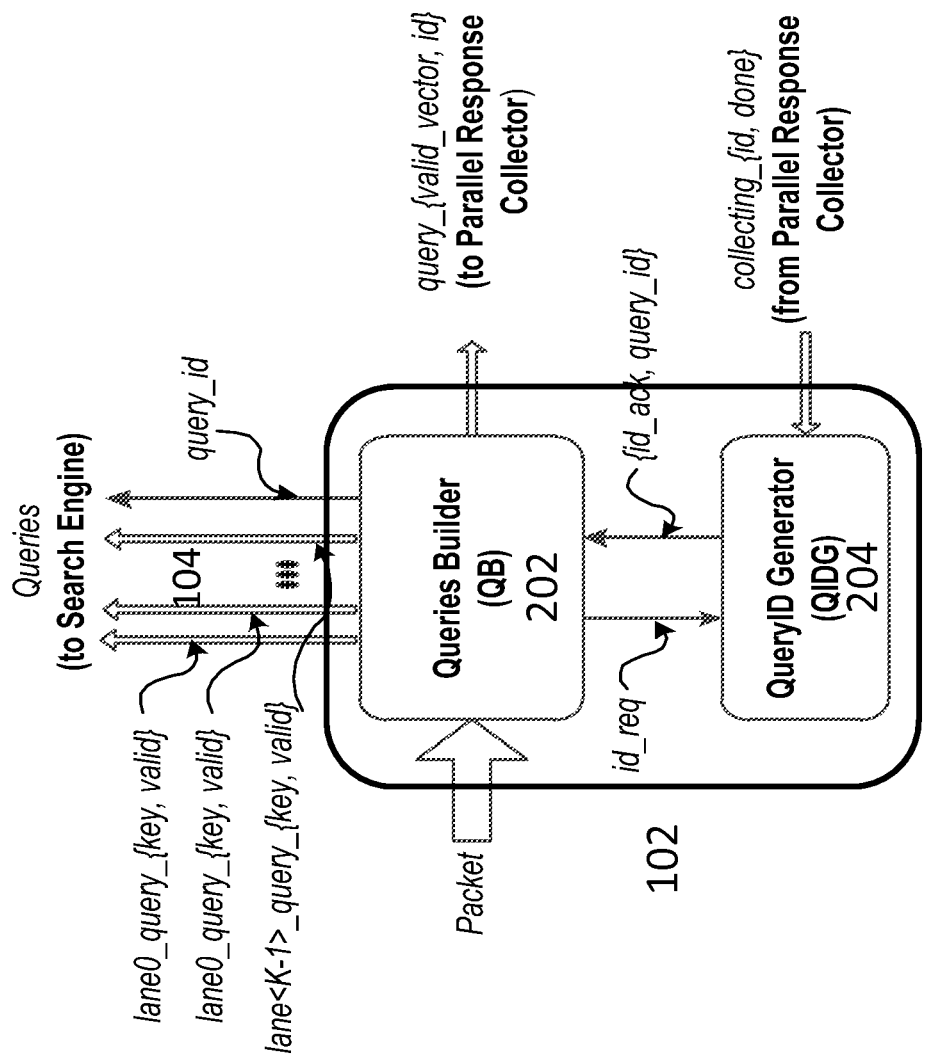
FIG. 2 is an example of a block diagram showing architecture of the Parallel Queries Generator of the network lookup engine according to an embodiment of the present invention.

FIG. 2 is an example of a block diagram showing architecture of the PQG 102 of the network lookup engine 100. As shown in FIG. 2, the PQG 102 may include two sub blocks: 1) a Queries Builder (QB) 202 configured to generate the plurality of (up to K) parallel lookup queries and to transmit these queries on K query lanes 104 to the search engine along with a query_id per incoming packet; 2) a QueryID Generator (QIDG) 204 configured to generate query_ids for the incoming packets upon receiving the id requests from the Queries Builder 202.

In some embodiments, the Queries Builder 202 is a common block running on the network processor of the network lookup engine 100. Its main task is to generate the lookup requests for incoming network packets following the network protocols the network lookup engine 100 supports. The design of the Queries Builder 202 can be based on any type of lookup queries generator with additional functionality to support generating the lookup queries parallel per packet.

In some embodiments, a unique query_id is added for all of the parallel lookup queries per packet to support out-of-order lookup responses collection by the network lookup engine 100. Specifically, the Queries Builder 202 acquires a query_id per packet from the QueryID Generator 204. Upon receiving a query_id from the QueryID Generator 204, the Queries Builder 202 is configured to send the valid lookup queries of the current packet to the search engine 100. In addition, the Queries Builder 202 is further configured to send a query_valid_vector (which is a K-bit vector representing which query lanes 104 carrying the valid lookup queries) and the query_id to the PRC 108 (discussed in details below) so that the PRC can properly collect the responses for its lookup queries.

In some embodiments, the QueryID Generator 204 is configured to maintain a pool of identification numbers (shortly named id). For each id_req received from the Queries Builder 202, the QueryID Generator 204 returns an id_ack along with a query_id if it has any id available in its ID pool. If no id is available in its ID pool, the QueryID Generator 204 will de-assert the id_ack signal so that the Queries Builder 202 will pause (does not send the lookup queries to the search engine for the current queried packet) until it receives a valid query_id from the QueryID Generator 204. Each time the Queries Builder 202 requests a query_id, an id is taken from the ID pool in the QueryID Generator 204. Once the PRC 108 completes collecting the lookup responses for all valid queries of that packet, the PRC 108 is configured to notify the QueryID Generator 204 to add that id back to the ID pool so that the id can be recycled and reused. This approach avoids all outstanding packets (the packets which are waiting for responses from the search engine) to have the same query_ids in addition to recycling query_ids.

Figure 3:
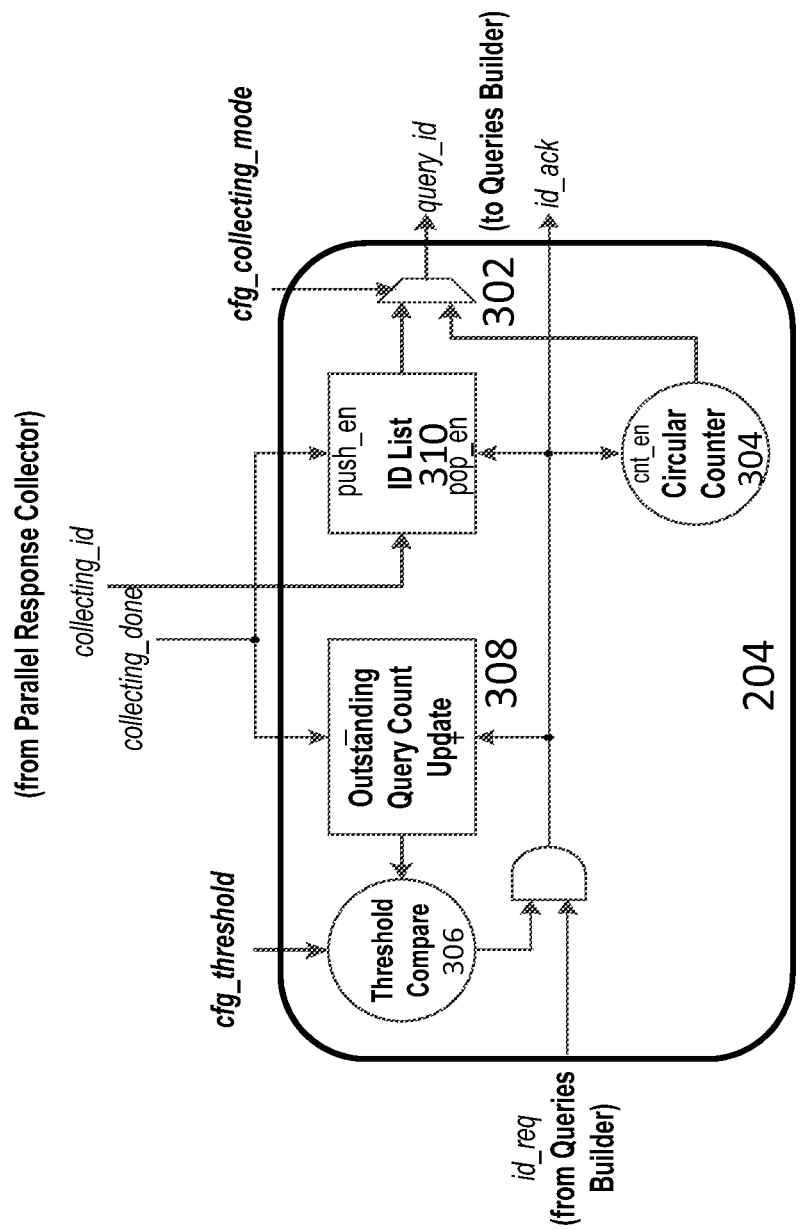
FIG. 3 is an example of a block diagram showing design of the QueryID Generator in the Parallel Queries Generator of the network lookup engine according to an embodiment of the present invention.

FIG. 3 is an example of a block diagram showing design of the QueryID Generator 204 in the PQG 102 of the network lookup engine 102. As shown in FIG. 3, the QueryID Generator 204 can be configured in one of two collecting modes: in-order mode and out-of-order mode, wherein the order collecting mode is configured by a configurable register 302 named cfg_collecting_mode.

In the in-order collecting mode, the query_id is selected from a N-modulo Circular Counter 304, which is configured to return ids in-order from 0 to N−1, circularly. To avoid the same query_id to be used for two different outstanding packets, the number of outstanding packets should not be larger than N. For more flexibility, a configurable register named cfg_threshold is configured to allow a user to program the threshold on the number of outstanding packets arbitrarily but not larger than N. As shown in FIG. 3, an Outstanding Query Count Updating block 308 is configured to increase the number of outstanding queries by 1 each time a query_id is sent to the Queries Builder 202 and to decrease the number of outstanding queries by 1 each time a collecting_id is received from the PRC 108. The Threshold Comparison block 306 is configured to compare the cfg_threshold value with the number of outstanding query packets from the outstanding query count update block 308. The query_id returned from the Circular Counter 304 is only sent to the Queries Builder 202 if the number of outstanding packets is less than or equal to the cfg_threshold value.

In the out-of-order collecting mode, the query_id is selected from an ID List 310 rather than from the Circular Counter 304. In some embodiments, the ID List 310 is a FIFO (first-in first-out block) list initialized with N entries from 0 to N−1 in any order. Each time the Queries Builder 202 requests a query_id, the first entry in the ID List 310 is popped and sent to the Queries Builder 202. No query_id would be sent to the Queries Builder 202 if the ID List 310 is empty. Each time the PRC 108 returns a collecting_id with the collecting_done signal asserted, the collecting_id is pushed to the tail of the ID List 310. Again, the users can control the number of outstanding packets as in the in-order mode by configuring the value of the cfg_threshold.

Figure 4:
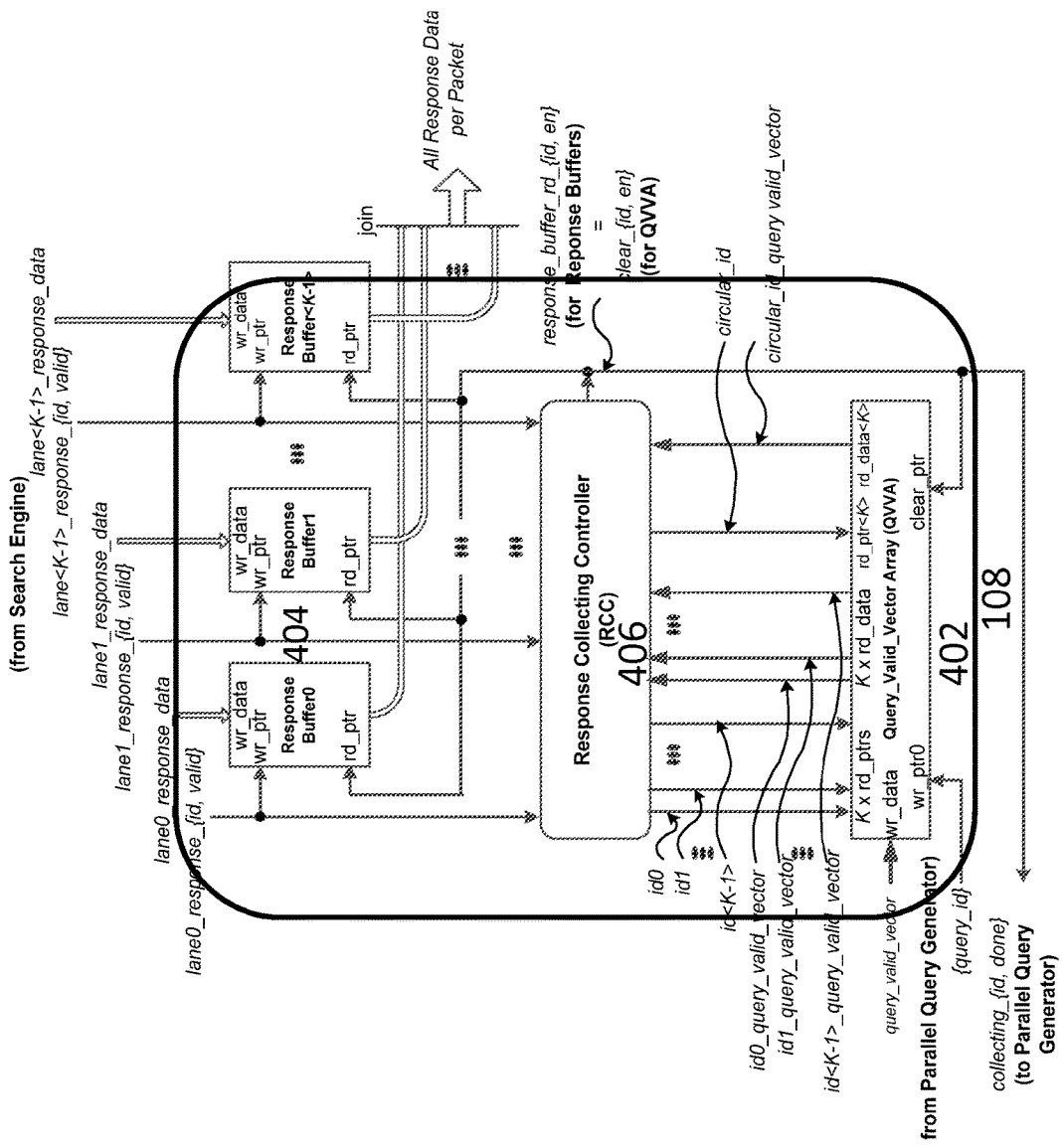
FIG. 4 is an example of block diagram showing overall architecture of the Parallel Responses Collector of the network lookup engine according to an embodiment of the present invention.

FIG. 4 is an example of block diagram showing overall architecture of the PRC 108 of the network lookup engine 100. As shown in FIG. 4, the PRC 108 may include the following sub blocks: 1) a Query_Valid_Vector Array (QVVA) 402 configured to buffer the query_valid_vectors of the query packets received from the PQG 102; 2) a plurality of (K) Response Buffers 404, each configured to temporarily store the response data received from the search engine on K response lanes 106 before being collected for the waiting queried packets; 3) a Response Collecting Controller (RCC) 406 configured to control the response collection in either in-order mode or out-of-order mode.

During operation, the query_valid_vector of each packet received from the PQG 102 is buffered into the QVVA 402. The entry position in the QVVA 402 for storing the received query_valid_vector is given by the corresponding received query_id. The QVVA 402 is configured to have a plurality of (N) entries for storing up to N query_valid_vectors given by up to N different query_ids.

Figure 5:
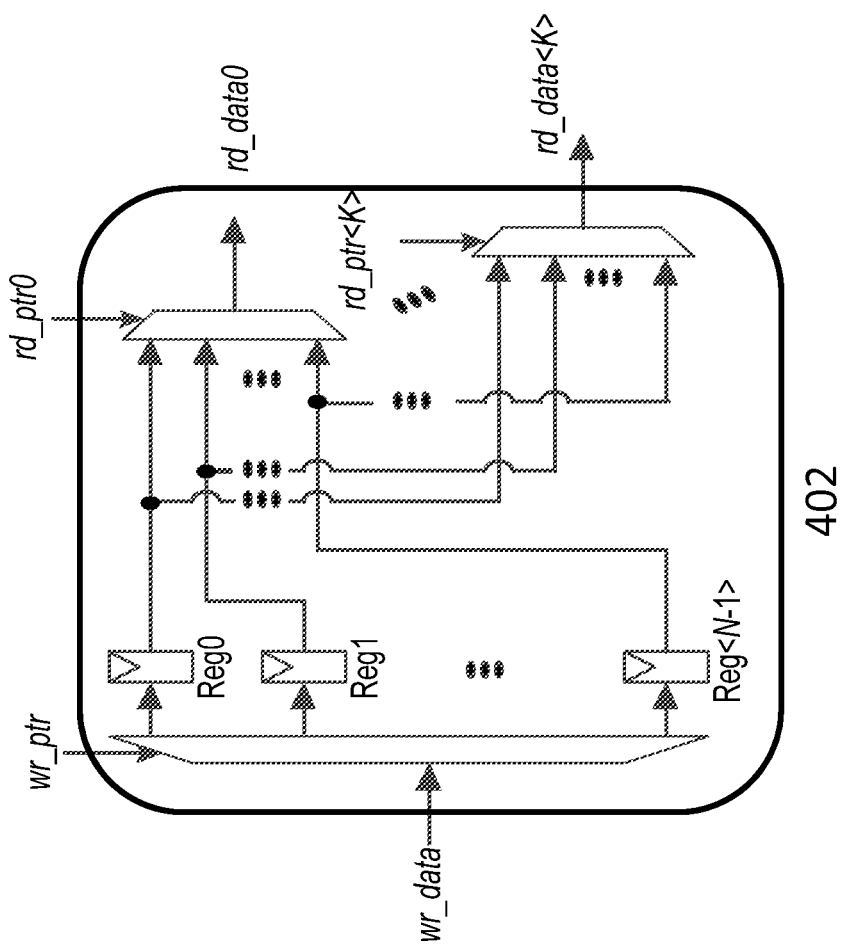
FIG. 5 is an example of a block diagram showing design of a Query_Valid_Vector Array according to an embodiment of the present invention.

FIG. 5 is an example of a block diagram showing design of the QVVA 402. As shown in FIG. 5, the QVVA 402 has an array of N registers (digital flip flops). The write pointer wr_ptr is used to select which register in the QVVA 402 for buffering the input data wr_data. In the design of PRC 108 as shown in FIG. 4, the wr_ptr port of the QVVA 402 is connected to the query_id signal and the wr_data port is connected to the query_valid_vector signal received from the PQG 102.

As shown in FIG. 4, the QVVA 402 has K+1 read ports, wherein K read ports are used by the RCC 406 for reading out up to K query_valid_vectors for comparing with the corresponding response_valid_vectors in the out-of-order mode, with one additional read port being used to read one query_valid_vector in the in-order mode.

In the design of PRC 108 as shown in FIG. 4, the lookup responses received from the search engine are stored in the Response Buffers 404 while they wait to be collected. In some embodiments, there are K Response Buffers 404 in the PRC 108 corresponding to K response lanes 106 for supporting K query lanes 104 in the PQG 102. For each valid response on a response lane 106, its response data is stored into the corresponding Response Buffer 404 on that response lane. The entry position in the Response Buffer 404 for storing the response data is given by the associated response_id received on that response lane. In some embodiments, each Response Buffer 404 is a traditional 1-write 1-read static random-access memory (SRAM) memory. The response_id and response_valid received on each response lane 106 are also sent to the RCC 406 for further collecting control.

In some embodiments, the Response Collecting Controller (RCC) 406 is configured to update the response_valid_vectors of all response_ids upon receiving the response_ids and response_valids from the response lanes 106. The RCC 406 then checks the query_valid_vectors stored in the QVVA 402 to see if there is any match between a response_valid_vector and a query_valid_vector of a certain id. If there is a match assumed at an id, the id is marked as a collecting_id. The RCC 406 now confirms that all responses for the corresponding queries of a packet with query_id equal to collecting_id have already been stored in the Response Buffers 404. The RCC 406 then issues a read request to the Response Buffers 404 to read out/collect the valid response data at the entry position given by the collecting_id. For each packet, not all but only the Response Buffers 404 marked by the response_valid_vector of that collecting_id are read. At this step, a response collection has been done for a packet and the RCC 406 then returns the collecting_id and collecting_done signals back to the PQG 102 for updating the ID pool in the QueryID Generator 204. At the same time, the RCC 406 is configured to clean up the query_valid_vector at the collecting_id position in the QVVA 402 and to restart another responses collection round for another packet.

Figure 6:
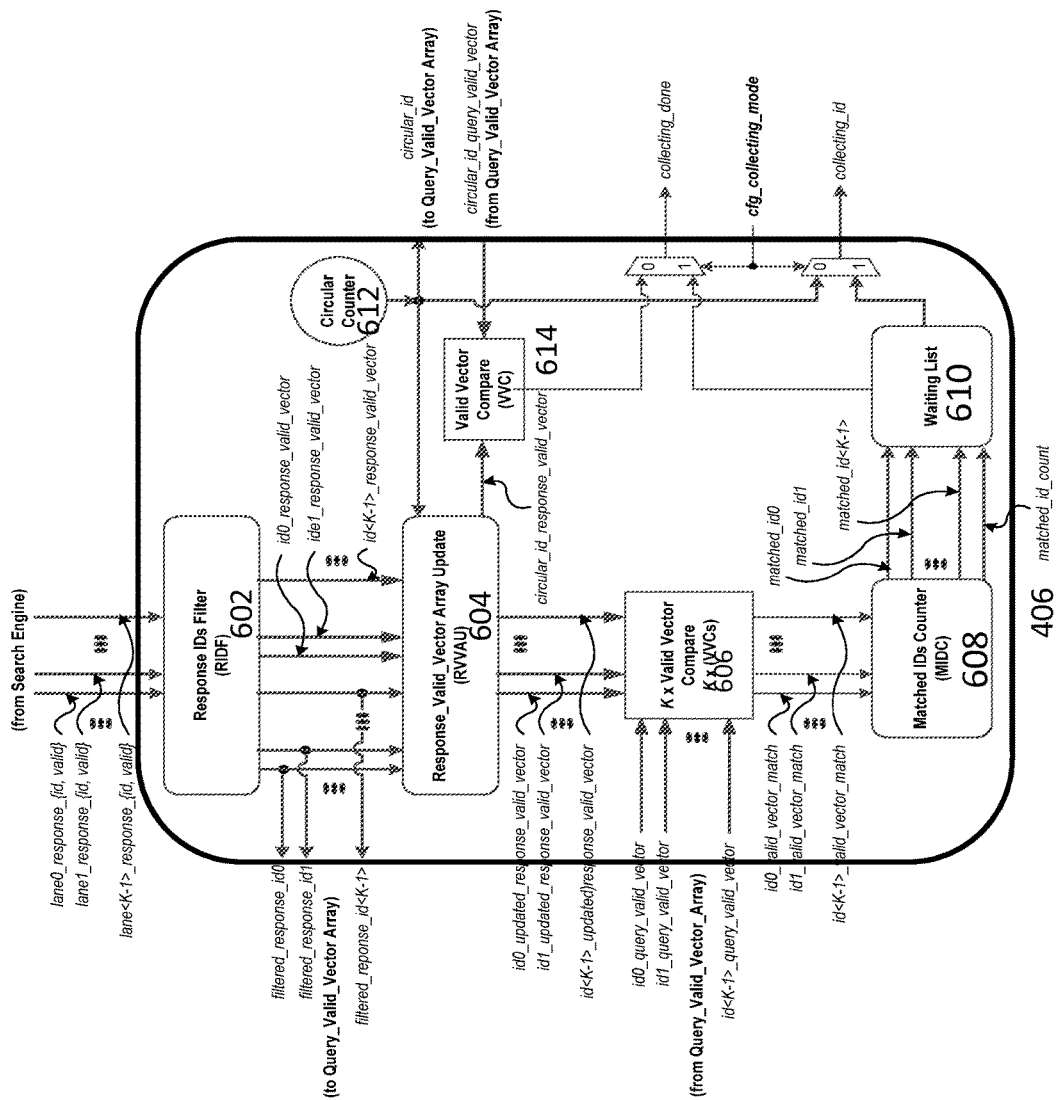
FIG. 6 is an example of a block diagram showing architecture of the Response Collecting Controller in the Parallel Responses Collector of the network lookup engine according to an embodiment of the present invention.

FIG. 6 is an example of a block diagram showing architecture of the RCC 406 in the PRC 108 of the network lookup engine 100. A shown in FIG. 6, the RCC 406 includes one or more of: a Response IDs Filter (RIDF) 602 configured to select unique/distinct ids from up to K valid response_ids returned by the search engine each cycle time on K response lanes 106, a Response_Valid_Vector Array Updating (RVVAU) block 604 configured to store and update the response_valid_vectors for all response_ids filtered by the RIDF 602, K Valid Vector Comparison (VVC) blocks 606 each configured to compare up to K response_valid_vectors in the RVVAU 604 with K query_valid_vectors in the QVVA 402, a Matched IDs Counter (MIDC) 608 configured to select the matched ids from the K VVCs 606, a waiting list 610 configured to pick one of the outputs from the MIDC 608 for using as a read pointer for reading the response data from Response Buffers 404 in the out-of-order mode a N-module Circular Counter 612 and another VVC 614 configured to serve in the in-order collecting mode.

Since there are K response lanes 106, there can be up to K valid response_ids returned by the search engine at the same time. Some of these response_ids could be the same, which means that multiple lookup queries of the same packet receive their responses at the same time. In an extreme case where all K response_ids are different, the search engine is returning K responses for K lookup queries of K different packets.

During operation, all the arriving valid response_ids on the K response lanes are passed to the RIDF 602, which selects only the distinct response_ids among them per cycle time. For each output response_id, the RIDF 602 also returns a K-bit valid vector that represents which response lanes among the K response lanes are carrying that response_id. In the extreme case where all matched ids are the same, only one id is selected by the RIDF 602. In another extreme case where all the matched ids are all different, then RIDF 602 will select all of them.

Figure 7:
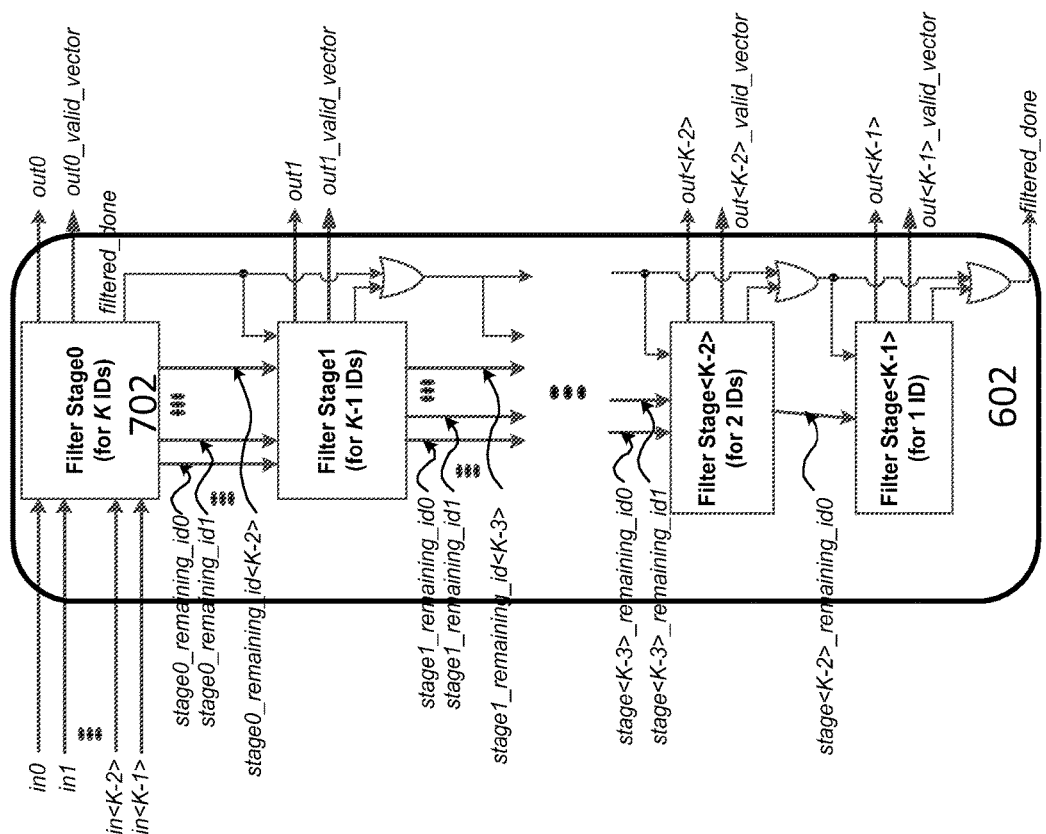
FIG. 7 is an example of a block diagram showing the design of Response IDs Filter in the Response Collecting Controller according to an embodiment of the present invention.

FIG. 7 is an example of a block diagram showing the design of the RIDF 602 in the RCC 406. As shown in FIG. 7, the RIDF 602 comprises a plurality of (K) Filtering Stages 702, wherein Stage<i> is configured to select one value from its valid inputs, then pass the remaining inputs after removing all inputs having the same values to the selected value to Stage<i+1>. At the same time, Stage<i> also returns a K-bit valid vector representing the positions of the removed inputs.

Figure 8:
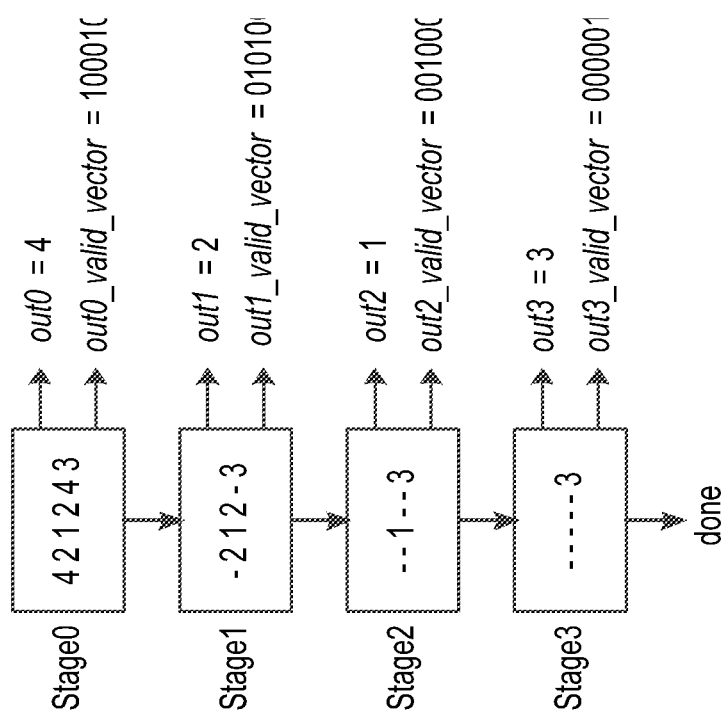
FIG. 8 is an example illustrating the operation of a Response IDs Filter with six valid inputs according to an embodiment of the present invention.

FIG. 8 depicts a non-limiting example illustrating the operation of the RIDF 602. In this example depicted in FIG. 8, there are six valid inputs (4, 2, 1, 2, 3) to the RIDF 602. Among these six inputs, '2' and '4' occur 2 times each. Stage0 of the RIDF 602 selects the first input is '4', removes all inputs having value of '4', and returns the valid_vector of '100010' representing the positions of '4' in the input list. The remaining inputs (2, 1, 2, 3) are sent to Stage1 of the RIDF 602. At Stage1, '2' is chosen and the output valid_vector is '010100' representing the positions of '2' in the input list. All '2's are subsequently removed from the inputs. The remaining inputs (1, 3) are sent to Stage2 of the RIDF 602. At Stage2, '1' is chosen then removed from the list. The output valid_vector of Stage2 is '001000' which represents the position of '1' in the input list. Finally, at Stage3 of the RIDF 602, the only one remaining input '3' is chosen and the valid_vector is '000001,' representing the position of '3' in the input list. The filtering job of the RIDF 602 is done at this stage.

As illustrated in the above example, the RIDF 602 is configured to finish the filtering job is done sooner because some of these inputs may be the same. This is in contrast to a traditional approach where K filtering stages are needed to filter K inputs. After the filtering job is done, the remaining filtering stages of the RIDF 602 should do nothing to save power and energy as well as latency. To this end, each filtering stage of the RIDF 602 is configured to send a filtering_done signal to the next stages if there is no remaining input for filtering. For a non-limiting example, if Stage<i> sends a filtering_done signal, all stages Stage<i+1>, Stage<i+2>, . . . , Stage<K−1> stop working to save power and reduce the latency of the RIDF 602.

Figure 9:
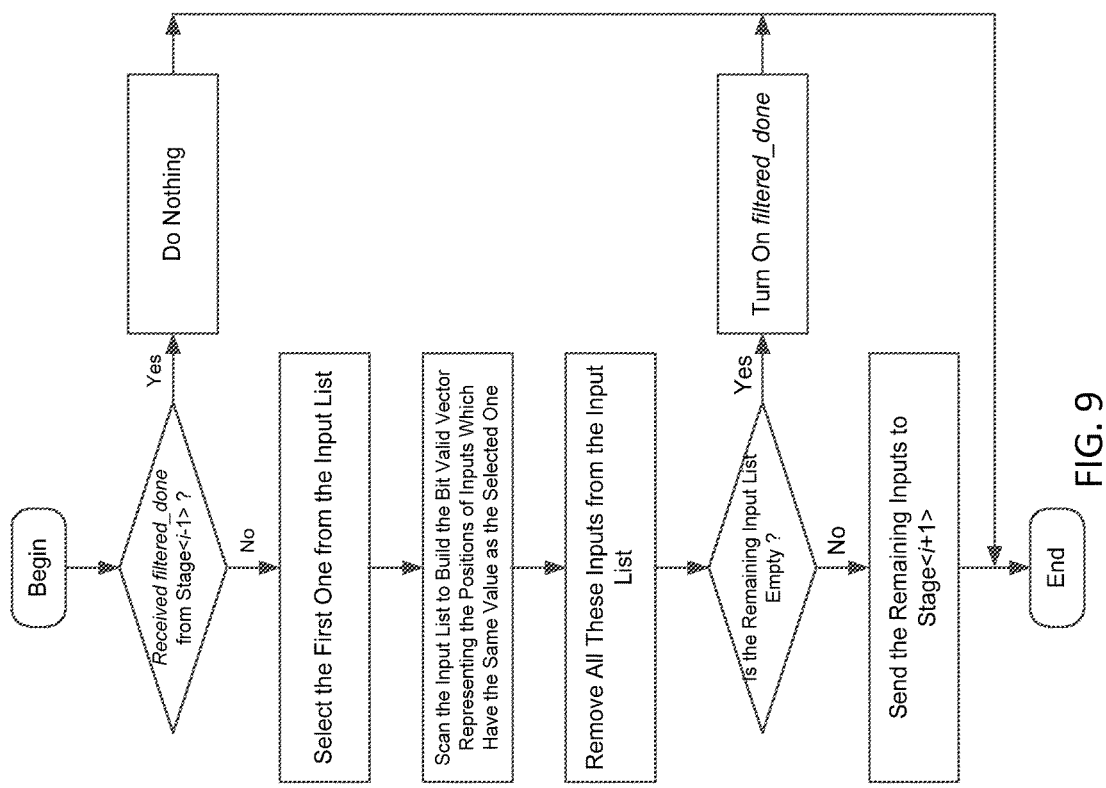
FIG. 9 is an example of a flow chart illustrating the operation of a Filtering Stage in the Response IDs Filter according to an embodiment of the present invention.

FIG. 9 is an example of a flow chart illustrating the operation of a filtering stage in the RIDF 602. In the example of FIG. 9, If a filtering stage receives the filtering_done signal, which means all inputs have already filtered by a previous stage, it does nothing. Otherwise, the filtering stage selects the first valid input from its input list, scans and builds a valid_vector representing the positions of all inputs having the same value as the selected one. The filtering stage then removes all these inputs from the input list. If there is no remaining input, the filtering stage turns on the filtering_done signal. Otherwise, the filtering stage sends the remaining inputs to the next filtering stage.

At the end of its operation, the RIDF 602 is configured to return an array of up to K distinguishing response_ids and their corresponding response_valid_vectors. Each response_valid_vector is a K-bit vector representing which response lanes 106 are carrying the corresponding valid response_id at current cycle time. These response_valid_vectors are then sent to a Response_Valid_Vector Array Update block 604, which is configured to store and update the value of the response_valid_vectors of all response_ids before they get collected.

In some embodiments, the RCC 406 is configured to maintain an array of N response_valid_vectors in the RVVAU 604 that is similar to the QVVA 402 containing N query_valid_vectors as discussed previously. Each response_valid_vector is a K-bit vector representing which response lanes 106 among K response lanes received a valid response for a certain response_id. For a certain received response_id, its response_valid_vector is updated by a simple bitwise OR operation between its current response_valid_vector returned by the RIDF 602 and its old response_valid_vector stored in the RVVAU 604. The response_valid_vectors after being updated are then stored back to the RVVAU 604. Since up to K valid responses can be received on K response lanes 106 at the same time and the received response_ids may be all different, up to K response_valid_vectors may be returned by the RIDF 602 and get updated simultaneously in the RVVA Updating block 604.

In the in-order mode, revisiting FIG. 6, the circular_id, which is generated by the N-modulo Circular Counter 612, is used as a read pointer to read a response_valid_vector in the RVVAU 604 and a query_valid_vector in the QVVA 402 in the in-order collecting mode. These two valid vectors are compared together by a VVC 614. If they are matched, the current circular_id is used as the collecting_id for reading the valid response_data from the Response Buffers 404 for the current packet. If no match is found, which means that the search engine did not completely return all responses for the current packet, then the Circular Counter 612 is disable so that the same circular_id is used to check again until a match is found between its query_valid_vector and its response_valid_vector. Since the query_id in the PQG 102 is also generated by the N-modulo Circular Counter 304 in this in-order mode, the circular_id is in the same sequence as the query_id. As such, the packets are forced to collect their responses in the same order as they come thus guaranteeing they are in-order.

In the out-of-order mode, the RCC 406 also uses the distinct response_ids returned by the RIDF 602 as read pointers to read up to K query_valid_vectors in the QVVA 402 while updating the RVVAU 604. The query_valid_vectors returned from the QVVA are then compared with the corresponding updated response_valid_vectors in the RVVAU 604 using the K VVCs 606, which then return up to K comparing match results in which a comparing match result is True for a response_id if its response_valid_vector is equal to its query_valid_vector.

In some embodiments, the comparing match results from the K VVCs 606 are passed to the Matched IDs Counter (MIDC) 606 where only matched_ids having a True matching result are selected. The MIDC 606 also returns the number of matched results.

As the output of the MIDC 606, a set of matched_ids are generated per cycle time, wherein any of them can be used as the collecting_id to read the Response Buffers 404. However, only one of the matched_ids can be used at each cycle time. Hence, these matched_ids are pushed into the waiting list 610 so that each of them is selected in turn.

Figure 10:
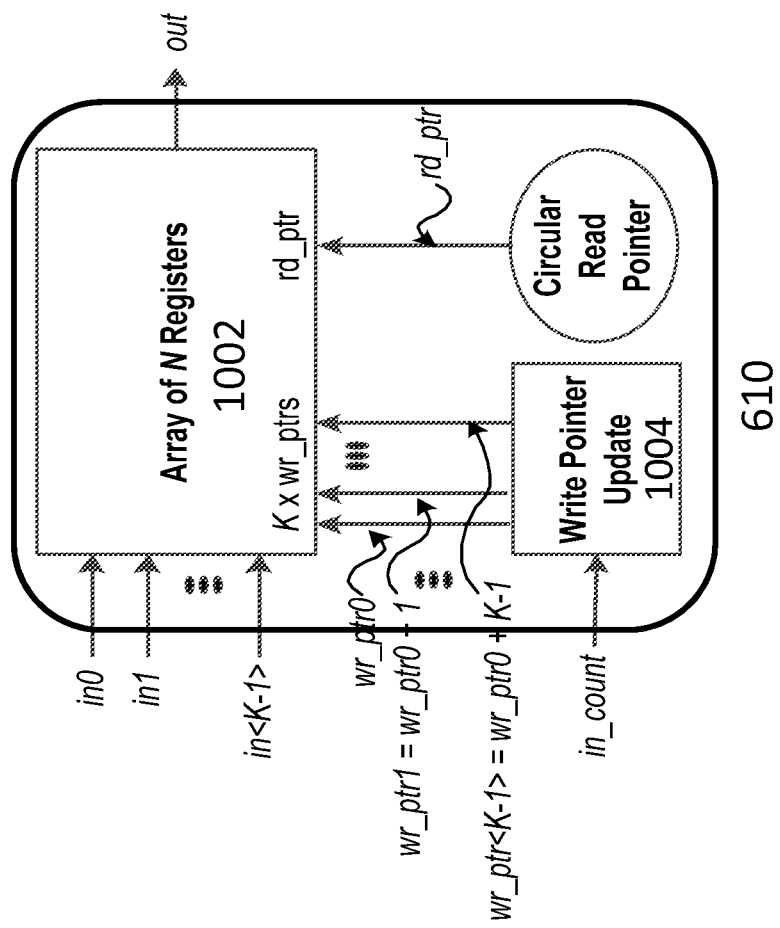
FIG. 10 is an example of a block diagram showing the design of the waiting list in the Response Collecting Controller according to an embodiment of the present invention.

FIG. 10 is an example of a block diagram showing the design of the waiting list 610 in the RCC 406. As shown in FIG. 10, the waiting list 610 may include an array of N registers 1002. The waiting list 610 may have K write ports, which allow writing up to K matched ids simultaneously, and only one read port for reading out one id each time. The in_count signal indicates how many valid ids from the MIDC 608 are needed to write into the waiting list 610 per cycle time. Assuming in_count is equal to m (m<=K), there are only m inputs in0, in1, in<m−1> among K inputs of the waiting list 610 are valid and these m valid inputs are written into the register array 1002 in the waiting list 610 at the positions given by m write pointers wr_ptr0, wr_ptr1, . . . , wr_ptr<m−1>. For simplicity, these inputs can be written at the consecutive positions of the array 1002, hence wr_ptr<i> is computed as wr_ptr0+i for every i from 0 to K−1. Since there are a fixed number of N registers indexed from 0 to N−1, the wr_ptr<i> is actually a modulo of N. After m valid inputs are written to the waiting list 610, the wr_ptr0 will be updated to a new value, which is equal to the old wr_ptr0+m; then other pointers wr_ptr1 to wr_ptr<K−1> are updated accordingly following the new wr_ptr0. Write pointers are updated by the Write Pointer Updating block 1004 as shown in FIG. 10.

Note that only one id is read out from the waiting list 610 each time. For simplicity, the read pointer rd_ptr is controlled by the simple N-modulo Circular Counter 612 as shown in FIG. 6. Although the read pointer given by the Circular Counter 612 is in-order, the value of the output id may be in an arbitrary order because the ids written into the waiting list 610 are random because the matched_ids outputted from the MIDC 608 are arbitrary due to the out-of-order response_ids returned by the search engine.

In the example of FIG. 6, the configurable register cfg_collecting_mode, which is the same as the register cfg_collecting_mode 302 in FIG. 3, is set accordingly to choose the order for response collection. For the in-order collecting mode, the collecting_id is chosen from the Circular Counter 612. In this mode, the first packet sending lookup queries gets the response collecting first regardless of the order of the responses from the search engine. For the out-of-order collecting mode, the collecting_id is chosen from the output of the waiting list 610, wherein the first packet having received complete responses by the search engine is the first to get its responses collected regardless of the order of incoming query packets. In either mode, after the RCC 406 issues the read commands to the Response Buffers 404 to read out response data at the entry position given by the collecting_id, the RCC 406 also clears the response_valid_vector in the RVVAU 604 and the query_valid_vector in the QVVA 402 at that entry position.

Figure 11:
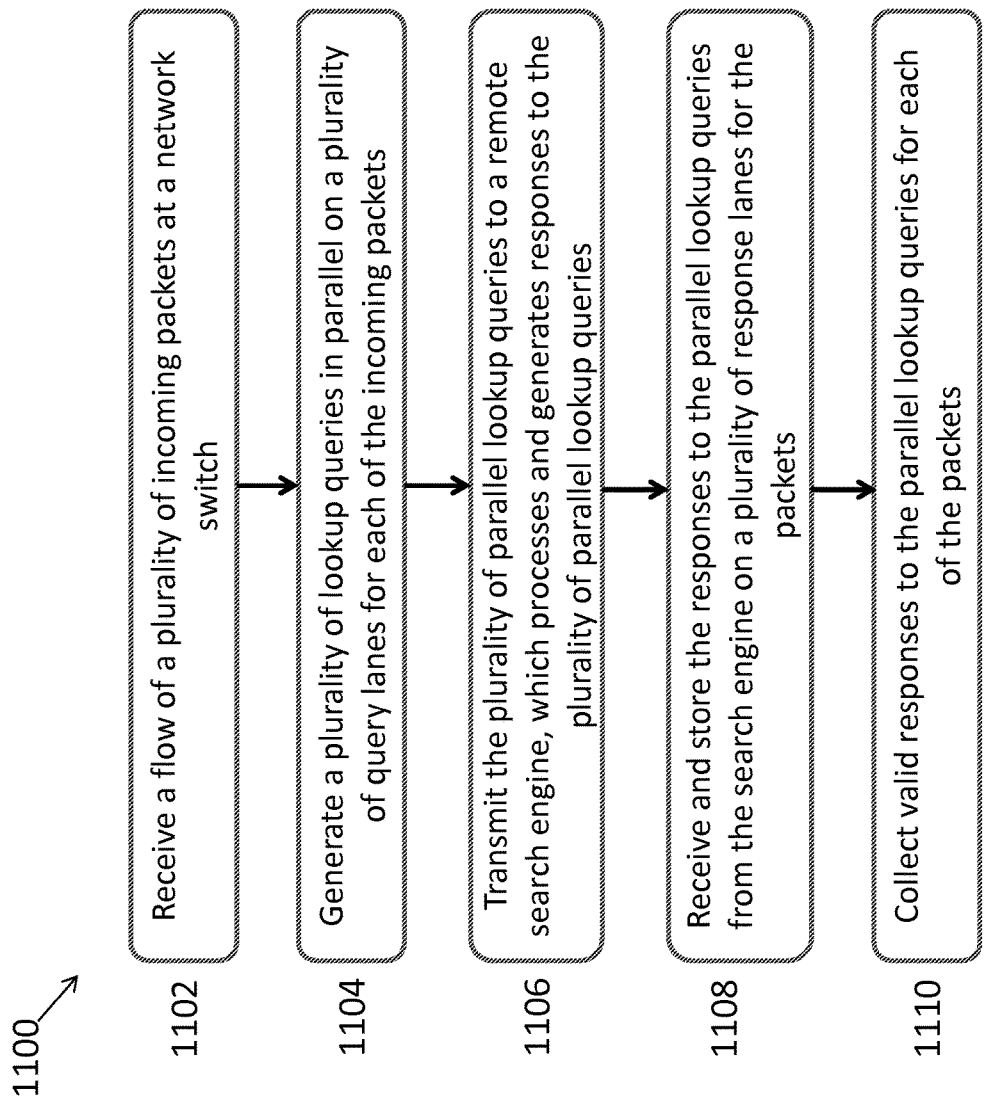
FIG. 11 depicts a flowchart of an example showing steps for collecting responses to a plurality of parallel lookup queries according to an embodiment of the present invention.

FIG. 11 depicts a flowchart of an example showing steps for collecting responses to a plurality of parallel lookup queries according to an embodiment of the present invention. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 11, the flowchart 1100 starts at block 1102, where a flow of a plurality of incoming packets are received at a network switch. The flowchart 1100 continues to block 1104, where a plurality of lookup queries are generated in parallel on a plurality of query lanes for each of the incoming packets. The flowchart 1100 continues to block 1106, where the plurality of parallel lookup queries are transmitted to a remote search engine, which processes and generates responses to the plurality of parallel lookup queries. The flowchart 1100 continues to block 1108, where the responses to the parallel lookup queries from the search engine on a plurality of response lanes for the packets are received and stored. The flowchart 1100 ends at block 1110, where valid responses to the parallel lookup queries are collected for each of the packets.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is therefore to understand that within the scope of the appended claims, the invention may be practiced otherwise than as specifically described herein. It is intended that the following claims and their equivalents define the scope of the invention.

What is claimed is:

1. A network lookup engine in a network switch, comprising:
 a hardware parallel queries generator configured to:
  receive a flow of a plurality of incoming packets at the network switch;
  generate a plurality of lookup queries in parallel on a plurality of query lanes for each individual incoming packet, wherein each individual incoming packet is processed with a different query of the plurality of generated lookup queries; and
  transmit the plurality of parallel lookup queries to a remote search engine, which processes and generates responses to the plurality of parallel lookup queries; and
 a hardware parallel responses collector configured to:
  receive and store the responses to the parallel lookup queries from the search engine on a plurality of response lanes for the packets in parallel;
  collect valid responses to the parallel lookup queries for each of the packets; and
  after collecting all of the valid responses for one of the packets, informing the hardware parallel queries generator that the collecting of the valid responses for the one of the packets is complete, wherein
   the one of the packets includes an id,
   the hardware parallel queries generator is further configured to reuse the id with a next incoming packet, and
   the next incoming packet is different from the one of the packets.

2. The network lookup engine of claim 1, wherein:
 the network lookup engine is configured to support an in-order collection mode in which the first packet having its lookup queries generated and transmitted by the hardware parallel queries generator gets its lookup responses collected by the hardware parallel responses collector first regardless of the order of the lookup responses returned by the search engine.

3. The network lookup engine of claim 1, wherein:
 the network lookup engine is configured to support an out-of-order mode in which the first packet having completed responses to its lookup queries received from the search engine has its lookup responses collected by the hardware parallel responses collector first regardless of the order of the incoming packets.

4. The network lookup engine of claim 2, wherein said collecting mode is configurable by software through a configurable register.

5. The network lookup engine of claim 1, wherein said hardware parallel queries generator comprises:
 a queries builder configured to generate a plurality of lookup keys for the plurality of parallel lookup queries per input packet;

a query_id generator configured to generate a unique query_id for all of the parallel lookup queries per input packet.

6. The network lookup engine of claim 5, wherein:
said queries builder is configured to acquire a query_id from the query_id generator for each packet; wherein the queries builder is allowed to transmit the lookup queries of the packet to the search engine only if the query_id generator returns a valid query_id.

7. The network lookup engine of claim 5, wherein said query_id generator comprises:
a modulo-N circular counter configured to generate a plurality of query_ids in an in-order mode;
an id list with N entries configured to maintain the plurality of query_ids in an out-of-order mode; and
an outstanding packet counter configured to count number of outstanding packets having lookup queries have been sent but the responses to the lookup queries from the search engine have not yet been fully collected;
a first configurable register configured to enable a user to configure the maximum number of outstanding packets;
a second configurable register configured to enable the user to select between the in-order mode and the out-of-order mode.

8. The network lookup engine of claim 7, wherein said id list is an N-depth first-in-first-out (FIFO) list in which entries are initialized by 0 N−1 in an arbitrary order.

9. The network lookup engine of claim 7, wherein said id list is used in the out-of-order mode, wherein a query_id is popped out each time the query_id generator receives an id request signal from the queries builder and wherein a collecting_id is pushed in each time the query_id generator receives an collecting_done signal from the hardware parallel responses collector.

10. The network lookup engine of claim 7, wherein value of the first configurable register is not larger than N to limit the number of outstanding packets and to avoid two outstanding packets having the same query_id.

11. The network lookup engine of claim 7, wherein a query_id is recycled for a new packet after the hardware parallel responses collector has done collecting all lookup responses for a packet previously associated to that query_id.

12. The network lookup engine of claim 7, wherein the said query_id generator is configured to send a query_valid_vector of a packet to the hardware parallel responses collector along with the query_id of the packet, wherein said query_valid_vector is a K-bit vector representing which query lanes among the plurality of query lanes containing valid lookup queries for that packet.

13. The network lookup engine of claim 1, wherein said hardware parallel responses collector comprises:
a plurality of response buffers configured to store the lookup responses received from the search engine on the response lanes before these responses get collected for the packets;
a query_valid_vector array configured to store a plurality of query_valid_vectors of the packets; and
a response collecting controller configured to control the responses collection for the packets.

14. The network lookup engine of claim 13, wherein each response buffer is a traditional one-read one-write N-depth static random-access memory (SRAM) memory.

15. The network lookup engine of claim 13, wherein the received responses are written at the entry position of the response buffers given by its response_id, and the collected responses are collected at the position pointed by the collecting_id given by the response collecting controller.

16. The network lookup engine of claim 13, wherein said query_valid_vector array is an array of N registers having one write port and K+1 read ports.

17. The network lookup engine of claim 16, wherein said one write port is used to write the query_valid_vector per query packet at the position given by its associated query_id.

18. The network lookup engine of claim 16, wherein said K read ports are used to read the query_valid_vectors by the response collecting controller in the out-of-order mode, wherein said another one read port is used to read one query_valid_vector by the response collecting controller in the in-order mode.

19. The network lookup engine of claim 13, wherein said response collecting controller further comprises:
a response ids filter configured to select unique response_ids among the response_ids returned by the search engine and build the valid vectors for these unique response_ids;
a response_valid_vector array updating block configured to update the response_valid_vectors of the unique response_ids filtered by the response ids filter; and
a N-modulo circular counter and a valid vector comparator configured to collect the responses in the in-order mode;
a plurality of valid vector comparators configured to compare a plurality of response_valid_vectors in the response_valid_vector array with the plurality of query_valid_vectors in the query_valid_vector array in the out-of-order mode; and
a matched ids counter configured to get matched_ids from the matching results returned by the valid vector comparators in the out-of-order mode;
a waiting list configured to buffer and select one id from the ids returned by the matched ids counter in the out-of-order mode; and
a configurable register configured to enable the user to select between the in-order mode and the out-of-order mode.

20. The network lookup engine of claim 19, wherein said response ids filter comprises a plurality of filtering stages, wherein each of the filtering stages is configured to receive inputs from its previous stage's outputs, select one valid input among them, at the same time scan and return a multi-bit valid vector representing positions of the inputs which have the same value as the selected one, remove all the these inputs and pass the remaining inputs to the next filtering stage.

21. The network lookup engine of claim 20, wherein each of the filtering stages is configured to assert a filtering_done output signal if it has no remaining valid input to pass to the next filtering stage so that all of the next stages stop working to save power and reduce overall latency.

22. The network lookup engine of claim 19, wherein the response_valid_vector array comprises a plurality of registers configured to store the response_valid_vectors of the response_ids.

23. The network lookup engine of claim 22, wherein the response_valid_vectors get updated each time when the search engine returns different valid response_ids on the response lanes.

24. The network lookup engine of claim 22, wherein the response_valid_vector of a response_id is a multi-bit vector representing which of the response lanes already returned valid responses for that response_id.

25. The network lookup engine of claim 19, wherein each valid vector comparator is configured to compare a response_valid_vector in the response_valid_vector array with a query_valid_vector in the query_valid_vector array at positions pointed by the same id.

26. The network lookup engine of claim 19, wherein said waiting list further comprises:
an array of registers configured to store the matched_ids;
a write pointer updating block configured to update a plurality of write pointers;
a N-modulo circular counter configured to update one read pointer.

27. The network lookup engine of claim 19, wherein the configurable register is used to select the collecting_id either from the circular counter in the in-order mode or from the waiting list in the out-of-order mode.

28. The network lookup engine of claim 19, wherein said response collecting controller is configured to clear the response_valid_vector in the response_valid_vector array and the query_valid_vector in the query_valid_vector array at the position given by the collecting_id each time a response has been collected for a packet.

29. A method for collecting responses to a plurality of parallel lookup queries, comprising:
receiving a flow of a plurality of incoming packets at a network switch;
generating a plurality of lookup queries in parallel on a plurality of query lanes for each individual incoming packet, wherein each individual incoming packet is processed with a different query of the plurality of generated lookup queries;
transmitting the plurality of parallel lookup queries to a remote search engine, which processes and generates responses to the plurality of parallel lookup queries;
receiving and storing the responses to the parallel lookup queries received from the search engine on a plurality of response lanes for the packets in parallel;
collecting valid responses to the parallel lookup queries for each of the packets; and
after collecting all of the valid responses for one of the packets, informing a hardware parallel queries generator that the collecting of the valid responses for the one of the packets is complete, wherein
the one of the packets includes an id,
the hardware parallel queries generator is further configured to reuse the id with a next incoming packet, and
the next incoming packet is different from the one of the packets.

30. The method of claim 29, further comprising:
supporting an in-order collection mode in which the first packet having its lookup queries generated and transmitted gets its lookup responses collected first regardless of the order of the lookup responses returned by the search engine.

31. The method of claim 29, further comprising:
supporting an out-of-order mode in which the first packet having completed responses to its lookup queries from the search engine has its lookup responses collected first regardless of the order of the incoming packets.

* * * * *